United States Patent
Merlin et al.

(10) Patent No.: US 10,517,006 B2
(45) Date of Patent: Dec. 24, 2019

(54) TECHNIQUES FOR REPORTING CHANNEL FEEDBACK IN WIRELESS COMMUNICATIONS

(71) Applicant: QUALCOMM Incorporated, San Diego, CA (US)

(72) Inventors: Simone Merlin, San Diego, CA (US); Jialing Li Chen, San Diego, CA (US); Guido Robert Frederiks, Watsonville, CA (US); Alfred Asterjadhi, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 15/483,672

(22) Filed: Apr. 10, 2017

(65) Prior Publication Data

US 2017/0303154 A1 Oct. 19, 2017

Related U.S. Application Data

(60) Provisional application No. 62/322,196, filed on Apr. 13, 2016.

(51) Int. Cl.
*H04W 24/10* (2009.01)
*H04L 1/00* (2006.01)
*H04W 84/12* (2009.01)
*H04W 88/02* (2009.01)
*H04W 88/08* (2009.01)

(52) U.S. Cl.
CPC ........... *H04W 24/10* (2013.01); *H04L 1/0023* (2013.01); *H04L 1/0028* (2013.01); *H04W 84/12* (2013.01); *H04W 88/02* (2013.01); *H04W 88/08* (2013.01)

(58) Field of Classification Search
None
See application file for complete search history.

(56) References Cited

U.S. PATENT DOCUMENTS

| 2011/0188462 A1* | 8/2011 | Yoo ............. H04L 1/0023 370/329 |
| 2012/0026909 A1 | 2/2012 | Seok |
| 2014/0301240 A1 | 10/2014 | Park et al. |
| 2015/0110046 A1 | 4/2015 | Merlin et al. |

(Continued)

FOREIGN PATENT DOCUMENTS

| EP | 3133757 A1 | 2/2017 |
| WO | WO-2016053024 A1 | 4/2016 |

OTHER PUBLICATIONS

International Search Report and Written Opinion issued in International Patent Application No. PCT/US2017/026977, dated Jul. 18, 2017 (18 pages).

(Continued)

*Primary Examiner* — James P Duffy
(74) *Attorney, Agent, or Firm* — Arent Fox, LLP

(57) ABSTRACT

Aspects described herein relate to requesting and/or reporting channel feedback. A request for channel feedback can be generated by an access point, where the request includes an indicator specifying that the request uses a first format different from a second format, where the indicator corresponds to a bit of a station (STA) information field defined by the second format. The access point can transmit, and a STA can receive, the request for channel feedback.

26 Claims, 6 Drawing Sheets

(56) References Cited

U.S. PATENT DOCUMENTS

2016/0143058 A1* 5/2016 Son ..................... H04B 17/318
370/329
2017/0079027 A1* 3/2017 Chun ..................... H04W 4/70

OTHER PUBLICATIONS

Madhavan N., (Toshiba): "Regarding HE NDPA Frame for DL Sounding Sequence; 11-16-0091-02-00ax-regarding-he-ndpa-frame-for-dl-sounding-sequence", IEEE Draft, vol. 802.11 ax, No. 2, Jan. 20, 2016, XP068104873, pp. 1-10.
International Search Report and Written Opinion issued in International Patent Application No. PCT/US2016/047878 dated Nov. 9, 2016.

* cited by examiner

TECHNIQUES FOR REPORTING CHANNEL FEEDBACK IN WIRELESS COMMUNICATIONS

CLAIM OF PRIORITY UNDER 35 U.S.C. § 119

The present Application for Patent claims priority to Provisional Application No. 62/322,196, entitled "TECHNIQUES FOR REPORTING CHANNEL FEEDBACK IN WIRELESS COMMUNICATIONS" filed Apr. 13, 2016, which is assigned to the assignee hereof and hereby expressly incorporated by reference herein for all purposes.

BACKGROUND

Aspects of the present disclosure relate generally to telecommunications, and more particularly to techniques for reporting channel feedback in a wireless local area network (WLAN).

The deployment of WLANs in the home, the office, and various public facilities is commonplace today. Such networks typically employ a wireless access point (AP) that connects a number of wireless stations (STAs) in a specific locality (e.g., home, office, public facility, etc.) to another network, such as the Internet or the like. An AP can request that the STA provide channel feedback of a wireless channel to allow the AP to improve quality of communication to the STA. The AP can initiate a request for channel feedback to the STA as a null data packet announcement (NDPA) to indicate sending of a null data packet (NDP) by the AP, which the STA can receive and use to determine the channel feedback. The NDPA can include certain information regarding the requested channel feedback. After sending the NDPA, the AP sends a NDP, which the STA receives and uses to compute a channel feedback matrix by processing one or more subcarriers as received by the STA based on the NDP to determine an associated power, phase shift, etc. of the NDP at the one or more subcarriers. The STA can compress the channel feedback matrix to indicate a set of angles representing a matrix rotation (e.g., Givens rotation) for the one or more subcarriers over a set of spatial streams. The AP receives the compressed channel feedback matrix, and can determine a steering matrix for steering transmissions via transmit antennas to improve beamforming to the STA.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, an apparatus for requesting channel feedback includes a memory storing channel feedback instructions, and at least one processor coupled with the memory. The at least one processor is configured to execute the channel feedback instructions to generate a request for channel feedback, where the request includes an indicator specifying that the request uses a first format different from a second format, where the indicator corresponds to a bit of a station (STA) information field defined by the second format. The at least one processor is also configured to execute the channel feedback instructions to transmit the request for channel feedback to a STA, and receive channel feedback from the STA.

In another aspect, a method for requesting channel feedback includes generating, by an access point, a request for channel feedback, where the request includes an indicator specifying that the request uses a first format different from a second format, where the indicator corresponds to a bit of a STA information field defined by the second format. The method also includes transmitting, by the access point, the request for channel feedback to a STA, and receiving, by the access point and from the STA, channel feedback based on the request.

In accordance with another aspect, an apparatus for reporting channel feedback includes a memory storing channel feedback instructions, and at least one processor coupled with the memory. The at least one processor is configured to execute the channel feedback instructions to receive a request to report channel feedback, where the request includes an indicator specifying that the request uses a first format different from a second format, where the indicator corresponds to a bit of a STA information field defined by the second format. The at least one processor is also configured to determine, from the request, one or more parameters related to reporting the channel feedback for a portion of a channel bandwidth, generate the channel feedback based on the one or more parameters, and transmit the channel feedback in response to the request.

In another aspect, a method for reporting channel feedback includes receiving, by a STA from an access point, a request to report channel feedback, where the request includes an indicator specifying that the request uses a first format different from a second format, where the indicator corresponds to a bit of a STA information field defined by the second format. The method also includes determining, by the STA and from the request, one or more parameters related to reporting the channel feedback for a portion of a channel bandwidth, generating, by the STA, the channel feedback based on the one or more parameters, and transmitting, by the STA to the access point, the channel feedback in response to the request.

Various aspects and features are described in further detail below with reference to various examples thereof as shown in the accompanying drawings. While the present aspects are described below with reference to various examples, it should be understood that the present aspects are not limited thereto. Those of ordinary skill in the art having access to the teachings herein will recognize additional implementations, modifications, and examples, as well as other fields of use, which are within the scope of the present aspects as described herein, and with respect to which the present aspects may be of significant utility.

BRIEF DESCRIPTION OF THE DRAWINGS

The features, nature, and advantages of the presented aspects will become more apparent from the detailed description set forth below when taken in conjunction with the drawings in which like reference characters identify correspondingly throughout, where dashed lines may indicate optional components or actions, and wherein.

DETAILED DESCRIPTION

Figure 1:
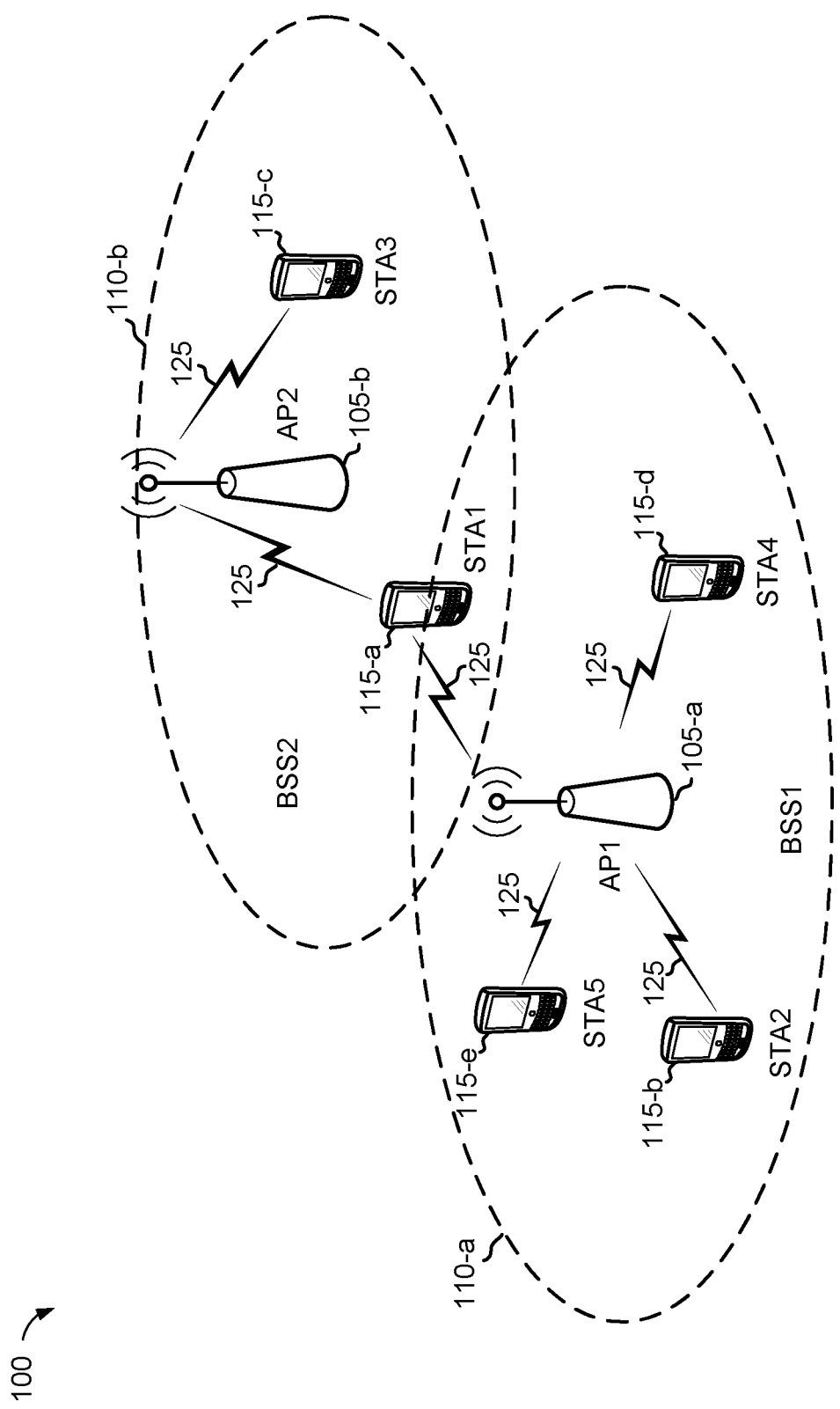
FIG. 1 is a conceptual diagram illustrating an example of a wireless local area network (WLAN) deployment.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware or software, and may be divided into other components.

Aspects are provided in the following description and related drawings directed to specific disclosed aspects. Alternate aspects may be devised without departing from the scope of aspects described herein. Additionally, well-known aspects may not be described in detail or may be omitted so as not to obscure more relevant details. Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects may be embodied in a number of different forms, all of which have been contemplated to be within the scope of the claimed subject matter. In addition, for each of the aspects described herein, the corresponding form of any such aspects may be described herein as, for example, "logic configured to" perform the described action.

The present aspects generally relate to including and processing additional information in a request for channel feedback to improve efficiency in reporting the channel feedback. In an example, a new format for a request for channel feedback (e.g., from an access point (AP)) is provided, where the format can allow for indicating one or more parameters to specify a granularity of channel feedback requested, which can impact the size of the channel feedback matrix reported by a wireless station (STA). For example, the request for channel feedback may indicate a partial bandwidth for which channel feedback is requested, which may be less than the actual bandwidth of the channel between the AP and STA. In another example, the request for channel feedback may indicate a tone grouping factor for requesting channel feedback for a portion of subcarriers. Both parameters may allow the STA to generate a smaller channel feedback matrix for reporting to the AP. In a specific example, the new format and/or additional parameters may relate to a null data packet announcement (NDPA) in wireless local area network (WLAN) communications. The new format and/or additional parameters, for example, may modify the existing structure of the NDPA, which may cause legacy STAs to not properly interpret the NDPA.

Additional aspects relate to mitigating impact of the new format of the NDPA to legacy STAs. A legacy STA (also referred to herein as a Very High Throughput (VHT) STA as one example) can be a STA that is not configured to process the new NDPA format. For example, due to the length of the NDPA increasing based on the added parameters, a legacy STA may detect its association identifier (AID) in an NDPA, though the NDPA may not be for the legacy STA. To prevent this occurrence, in one example, the AP can ensure that any byte that would be parsed by a legacy STA as an AID does not match the legacy STA AID. For example, the AP can set the most significant bit (MSB) of any byte that would be interpreted by the legacy STA as the first byte of a STA information field to 1, where legacy STAs may expect a 0 in the first byte of the AID. Similarly, in an example, the AP may set the MSB of any byte that would be interpreted by the legacy STA as the first byte of a STA information field to not match any corresponding legacy STA AID (e.g., by additionally limiting the AID assigned to legacy STAs in this regard). Thus, for example, a legacy STA receiving the new format of the NDPA may encounter the 1 in the MSB of the STA AID field, and may accordingly ignore the NDPA. In another example, the AP may use a new frame control field value specified in the STA information field of the NDPA to indicate the new format is being used, and high efficiency (HE) STAs capable of interpreting the new format may determine that the new format is used based on the frame control field value. In another example, the AP can apply a cyclic redundancy check (CRC) to the NDPA using an extra byte or modified byte known to HE STAs, which the HE STAs can modify to perform the CRC with the correct values. In this example, the CRC may fail for legacy STAs, and thus the legacy STAs may not process NDPAs of the new format. In yet another example, the AP may use the legacy NDPA format to indicate the additional parameters in multiple STA information fields. Alternatively, legacy STAs may receive the NDPA and improperly process the NDPA, but it may not matter as the legacy STAs may then be unable to recognize the associated NDP from the AP.

FIG. 1 is a wireless communication system 100 illustrating an example of a wireless local area network (WLAN) deployment in connection with various techniques described herein. The WLAN deployment may include one or more access points (APs) and one or more wireless stations (STAs) associated with a respective AP. In this example, there are only two APs deployed for illustrative purposes: AP1 105-*a* in basic service set 1 (BSS1) and AP2 105-*b* in BSS2. AP1 105-*a* is shown having at least two associated STAs (STA1 115-*a*, STA2 115-*b*, STA4 115-*d*, and STA5 115-*e*) and coverage area 110-*a*, while AP2 105-*b* is shown having at least two associated STAs (STA1 115-*a* and STA3 115-*c*) and coverage area 110-*b*. In the example of FIG. 1, the coverage area of AP1 105-*a* overlaps part of the coverage area of AP2 105-*b* such that STA1 115-*a* is within the overlapping portion of the coverage areas. The number of BSSs, APs, and STAs, and the coverage areas of the APs described in connection with the WLAN deployment of FIG. 1 are provided by way of illustration and not of limitation.

Moreover, aspects of the various techniques described herein are at least partially based on the example WLAN deployment of FIG. 1 but need not be so limited.

The APs (e.g., AP1 105-*a* and AP2 105-*b*) shown in FIG. 1 are generally fixed terminals that provide backhaul services to STAs within its coverage area or region. In some applications, however, the AP may be a mobile or non-fixed terminal. The STAs (e.g., STA1 115-*a*, STA2 115-*b*, STA3 115-*c*, STA4 115-*d*, and STA5 115-*e*) shown in FIG. 1, which may be fixed, non-fixed, or mobile terminals, utilize the backhaul services of their respective AP to connect to a network, such as the Internet. Examples of an STA include, but are not limited to: a cellular phone, a smart phone, a laptop computer, a desktop computer, a personal digital assistant (PDA), a personal communication system (PCS) device, a personal information manager (PIM), personal navigation device (PND), a global positioning system, a multimedia device, a video device, an audio device, a device for the Internet-of-Things (IoT), or any other suitable wireless apparatus requiring the backhaul services of an AP. An STA may also be referred to by those skilled in the art as: a subscriber station, a mobile unit, a subscriber unit, a wireless unit, a remote unit, a mobile device, a wireless device, a wireless communications device, a remote device, a mobile subscriber station, an access terminal, a mobile terminal, a wireless station, a remote terminal, a handset, a user agent, a mobile client, a client, user equipment (UE), or some other suitable terminology. An AP may also be referred to as: a base station, a base transceiver station, a radio base station, a radio transceiver, a transceiver function, a small cell, or any other suitable terminology. The various concepts described throughout are intended to apply to all suitable wireless apparatus regardless of their specific nomenclature.

Each of STA1 115-*a*, STA2 115-*b*, STA3 115-*c*, STA4 115-*d*, and STA5 115-*e* may be implemented with a protocol stack. The protocol stack can include a physical layer for transmitting and receiving data in accordance with the physical and electrical specifications of the wireless channel, a data link layer for managing access to the wireless channel, a network layer for managing source to destination data transfer, a transport layer for managing transparent transfer of data between end users, and any other layers necessary or desirable for establishing or supporting a connection to a network.

Each of AP1 105-*a* and AP2 105-*b* can include software applications and/or circuitry to enable associated STAs to connect to a network via communication links 125. The APs can send frames to their respective STAs and receive frames from their respective STAs to communicate data and/or control information (e.g., signaling).

Each of AP1 105-*a* and AP2 105-*b* can establish a communication link 125 with an STA that is within the coverage area of the AP. Communication links 125 can comprise communications channels that can enable both uplink and downlink communications. When connecting to an AP, an STA can first authenticate itself with the AP and then associate itself with the AP. Once associated, a communication link 125 can be established between the AP and the STA such that the AP and the associated STA can exchange frames or messages through a direct communications channel.

While aspects are described in connection with a WLAN deployment or the use of Institute of Electrical and Electronics Engineers (IEEE) 802.11-compliant networks (e.g., IEEE 802.11-ac, IEEE 802.11-ax, etc.), those skilled in the art will readily appreciate, the various aspects described throughout may be extended to other networks employing various standards or protocols including, by way of example, BLUETOOTH® (Bluetooth), HiperLAN (a set of wireless standards, comparable to the IEEE 802.11 standards, used primarily in Europe), and other technologies used in wide area networks (WAN)s, WLANs, personal area networks (PAN)s, or other suitable networks now known or later developed. Thus, the various aspects presented throughout for scheduling and grouping users or STAs for data transmission over an orthogonal frequency division multiple access (OFDMA) frame may be applicable to any suitable wireless network regardless of the coverage range and the wireless access protocols utilized.

In an aspect, an AP, such as AP1 105-*a*, may communicate with multiple STAs, such as STAs 115-*a*, 115-*b*, 115-*d*, and 115-*e* using MU-MIMO. For example, AP1 105-*a* may group a subset of the STAs within proximity of AP1 105-*a*, such as STAs 115-*a*, 115-*b*, 115-*d*, and 115-*e* for uplink data transmission over an OFDMA frame. The subset of APs may be considered a multi-user group and the AP1 105-*a* may control the transmission power of the STAs 115-*a*, 115-*b*, 115-*d*, and 115-*e* based on a power imbalance between the STAs. Further, by controlling the power of the STAs, the AP 105-*a* may have greater flexibility in determining how to group the STAs for uplink communications (e.g., which STAs transmit within the same OFDMA frame). In another aspect, an AP, such as AP1 105-*a* may communicate with one STA, such as STAs 115-*a*, 115-*b*, 115-*d*, or 115-*e* using single user (SU)-MIMO.

In an aspect, an AP, such as AP1 105-*a*, can request channel feedback from one or more STAs, such as STAs 115-*a*, 115-*b*, 115-*d*, and/or 115-*e*. AP1 105-*a* can utilize a new format for the request that specifies additional parameters, which may limit channel feedback to a partial bandwidth, using a tone grouping factor, etc. Accordingly, the one or more STAs 115-*a*, 115-*b*, 115-*d*, and/or 115-*e*, which can be HE STAs that can detect the new format for the request, can receive the request for channel feedback (e.g., as an NDPA with a new format), receive an associated transmission from the AP1 105-*a* (e.g., an NDP), compute channel feedback based on the associated transmission and according to one or more parameters in the request, and transmit a channel feedback matrix to the AP1 105-*a*.

In an aspect, the AP1 105-*a* may take measures in an attempt to ensure one or more legacy STAs, e.g., one or more of STAs 115-*a*, 115-*b*, 115-*d*, and/or 115-*e*, do not process the request, as the additional parameters may cause the one or more legacy STAs to detect its AID in the request though the request is intended for a different HE STA. For example, the AP1 105-*a* can ensure that any bit, byte, or other portion in the new format that may be parsed by a legacy STA as an AID does not match an AID of legacy STAs. In another example, AP1 105-*a* may use a new frame control field value to indicate the new format, such that legacy STAs may not process the new format request based on the different frame control field value. In another example, AP1 105-*a* may modify CRC for the request of the new format using one or more additional or modified bytes known by HE STAs, causing CRC of the request to fail at legacy STAs. In yet another example, AP1 105-*a* may use multiple requests of the legacy format to indicate the additional parameters.

Figure 5:
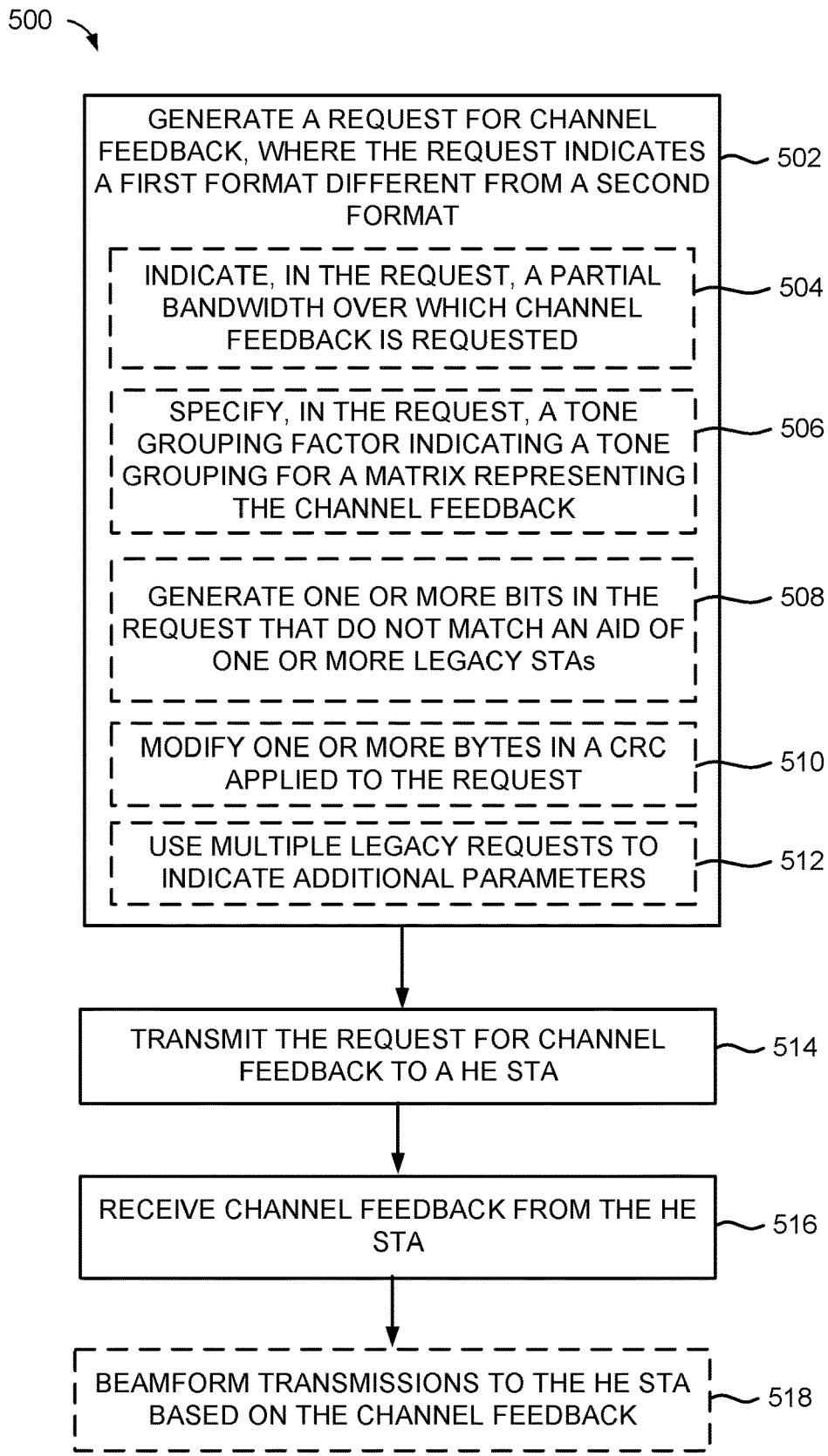
FIG. 5 is a flow diagram illustrating an example of a method of requesting channel feedback in accordance with various aspects described herein.
Figure 6:
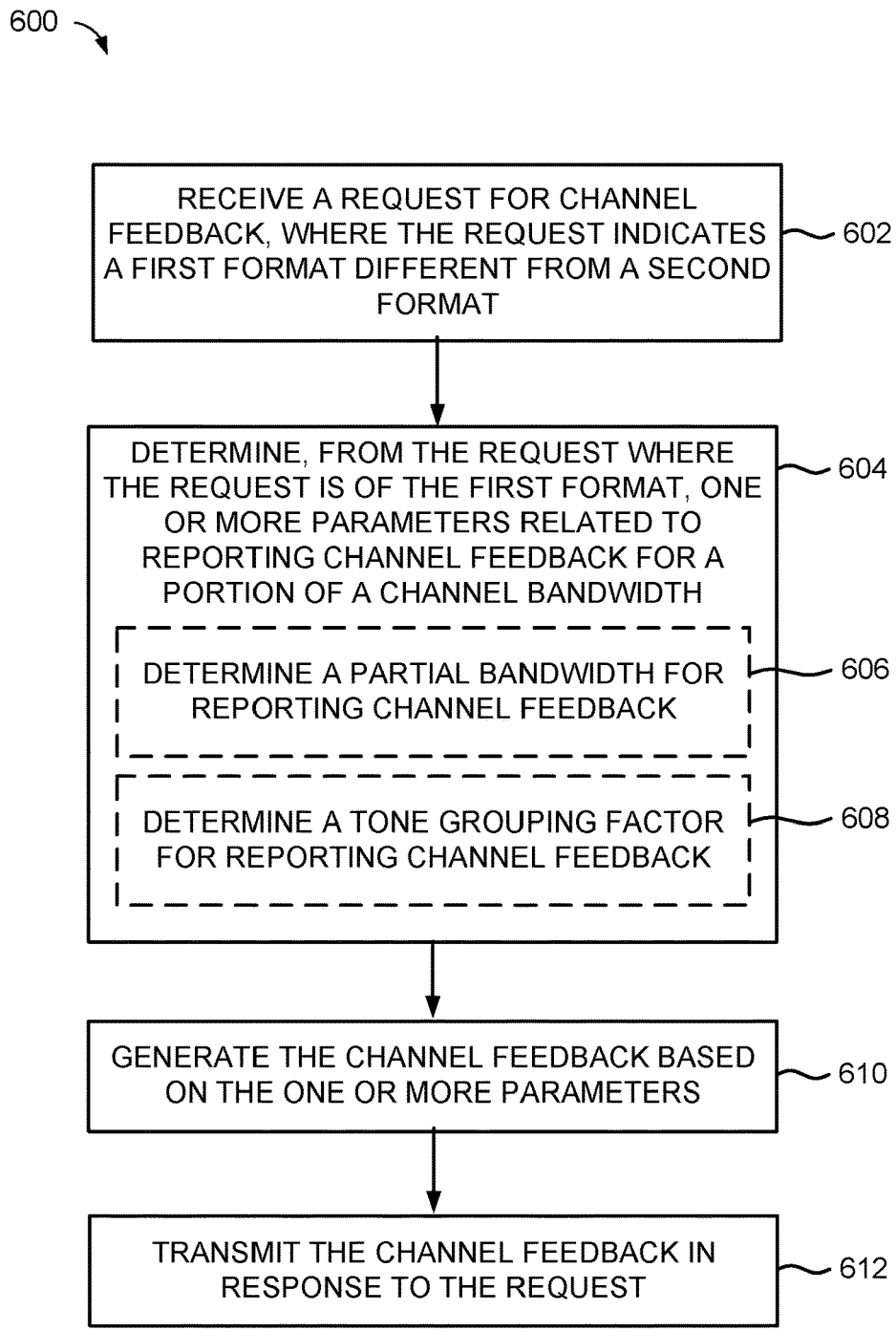
FIG. 6 is a flow diagram illustrating an example of a method of reporting channel feedback in accordance with various aspects described herein.

Referring to FIGS. 2, 3, 5, and 6, aspects are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described below in FIGS. 5 and 6 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

Figure 2:
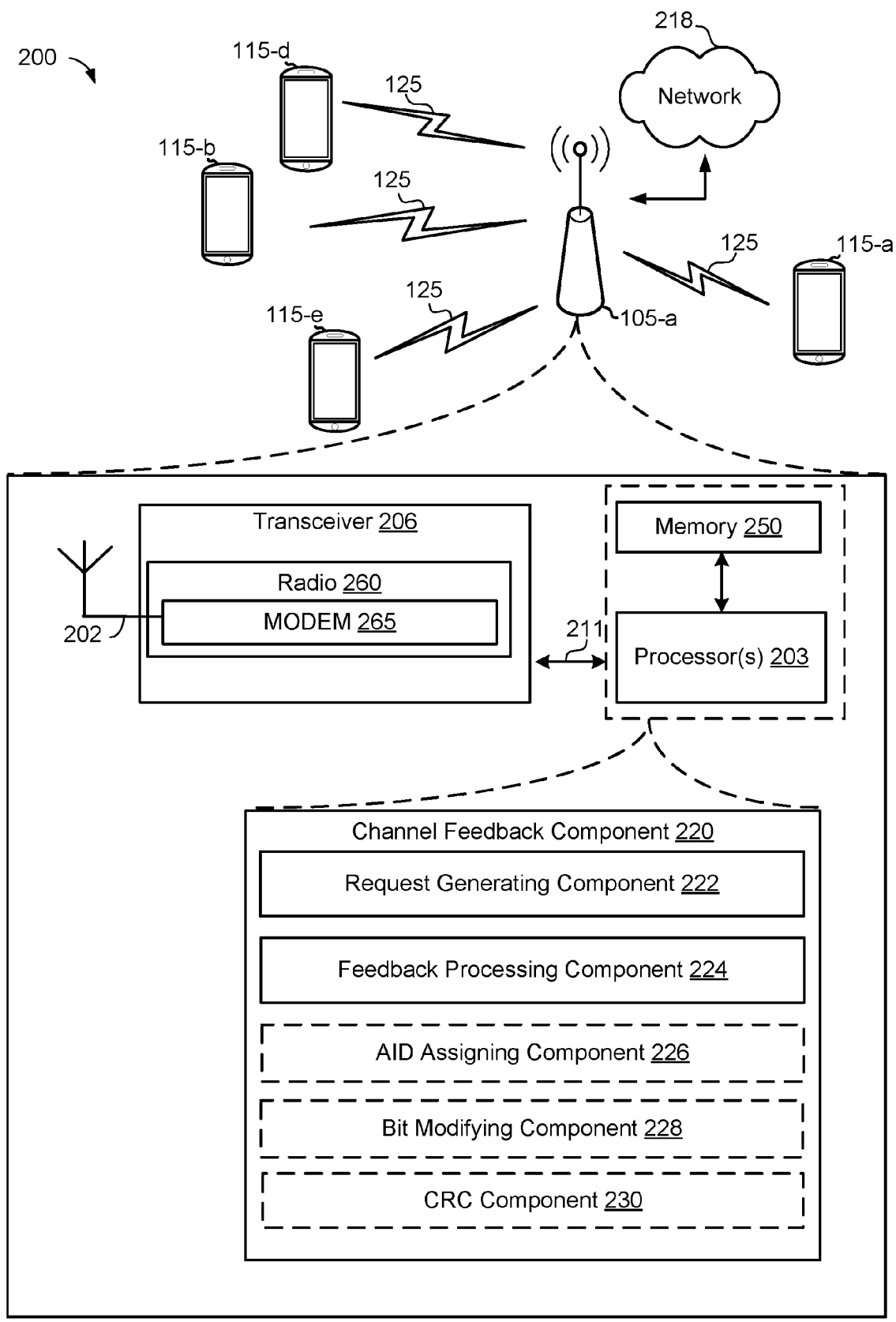
FIG. 2 is a schematic diagram of an example of a communication network including aspects of an access point for requesting channel feedback in a WLAN in accordance with various aspects described herein.

Referring to FIG. 2, in an aspect, a wireless communication system 200 includes STAs 115-a, 115-b, 115-d, and 115-e in wireless communication with at least one AP, such as AP1 105-a connected to network 218, similar to STAs 115-a, 115-b, 115-d, and 115-e, and AP1 105-a of FIG. 1. The STAs 115-a, 115-b, 115-d, and 115-e may communicate with network 218 via AP1 105-a. In an example, STAs 115-a, 115-b, 115-d, and 115-e may transmit and/or receive wireless communication to and/or from AP1 105-a via one or more communication links 125. Such wireless communications may include, but are not limited to, data, audio and/or video information. In some instances, such wireless communications may include control or similar information. In an aspect, an AP, such as AP1 105-a may be configured to request channel feedback from one or more STAs, such as STAs 115-a, 115-b, 115-d, and 115-e, using a new format for the request that is different from a legacy format (e.g., a VHT format of a NDPA). For example, the new format may correspond to a NDPA frame format defined in IEEE 802.11ax (e.g., a HE NDPA frame format), and/or the legacy format may correspond to a NDPA frame format defined in IEEE 802.11ac (e.g., a VHT frame format).

In an aspect, AP1 105-a may include a memory 250, one or more processors 203 and a transceiver 206. The memory 250, one or more processors 203 and the transceiver 206 may communicate internally via a bus 211. In some examples, the memory 250 and the one or more processors 203 may be part of the same hardware component (e.g., may be part of a same board, module, or integrated circuit). Alternatively, the memory 250 and the one or more processors 203 may be separate components that may act in conjunction with one another. In some aspects, the bus 211 may be a communication system that transfers data between multiple components and subcomponents of the AP1 105-a. In some examples, the one or more processors 203 may include any one or combination of modem processor, baseband processor, digital signal processor, and/or transmit processor. Additionally or alternatively, the one or more processors 203 may include a channel feedback component 220 for carrying out one or more methods or procedures described herein. The channel feedback component 220 may comprise hardware, firmware, and/or software and may be configured to execute code or perform instructions stored in a memory (e.g., a computer-readable storage medium).

In some examples, the AP1 105-a may include the memory 250, such as for storing data used herein and/or local versions of applications or channel feedback component 220 and/or one or more of its subcomponents being executed by the one or more processors 203. Memory 250 can include any type of computer-readable medium usable by a computer or processor 203, such as random access memory (RAM), read only memory (ROM), tapes, magnetic discs, optical discs, volatile memory, non-volatile memory, and any combination thereof. In an aspect, for example, memory 250 may be a computer-readable storage medium (e.g., a non-transitory medium) that stores computer-executable code. The computer-executable code may define one or more operations or functions of channel feedback component 220 and/or one or more of its subcomponents, and/or data associated therewith. The computer-executable code may define these one or more operations or functions when AP1 105-a is operating processor 203 to execute channel feedback component 220 and/or one or more of its subcomponents. In some examples, the AP1 105-a may further include a transceiver 206 for transmitting a request for channel feedback to, and/or receiving a channel feedback matrix from, a STA, such as 115-a, 115-b, 115-d, and 115-e. The transceiver 206 may comprise hardware, firmware, and/or software and may be configured to execute code or perform instructions stored in a memory (e.g., a computer-readable storage medium). The transceiver 206 may include multiple radios and modems including radio 260 comprising a modem 265. In an aspect, AP1 105-a and transceiver 206 supports SU-MIMO, MU-MIMO that enables multiple wireless connections such as a wireless local area network (WLAN) or a short distance communication protocol (e.g., Bluetooth radio) with a plurality of STAs, such as STAs 115-a, 115-b, 115-d, and 115-e, etc. The radio 260 may utilize one or more antennas 202 for transmitting signals to and receiving signals from a plurality of STAs, such as STAs 115-a, 115-b, 115-d, and 115-e. Transceiver 206 may include a radio frequency (RF) receiver, an RF transmitter, related processors, etc.

In particular, processor(s) 203 and/or memory 250 may execute actions or operations defined by channel feedback component 220 or its subcomponents. For instance, processor(s) 203 and/or memory 250 may execute actions or operations defined by a request generating component 222 for generating a request for channel feedback for transmitting to one or more STAs. In an aspect, for example, request generating component 222 may include hardware (e.g., one or more processor modules of the processor(s) 203) and/or computer-readable code or instructions stored in memory 250 and executable by at least one of the processor(s) 203 to perform the specially configured request generating operations described herein. Further, for instance, processor(s) 203 and/or memory 250 may execute actions or operations defined by a feedback processing component 224 for processing channel feedback received from the one or more STAs (e.g., to determine a steering matrix for transmitting signals to the one or more STAs). In an aspect, for example, feedback processing component 224 may include hardware (e.g., one or more processor modules of the processor(s) 203) and/or computer-readable code or instructions stored in memory 250 and executable by at least one of the processor(s) 203 to perform the specially configured feedback processing operations described herein.

Further, for instance, processor(s) 203 and/or memory 250 may optionally execute actions or operations defined by an AID assigning component 226 for assigning AIDs to one or more legacy STAs to avoid a new format of the request for channel feedback being processed by the one or more legacy STAs. In an aspect, for example, AID assigning component 226 may include hardware (e.g., one or more processor modules of the processor(s) 203) and/or computer-readable code or instructions stored in memory 250 and executable by at least one of the processor(s) 203 to perform the specially configured AID assigning operations described herein. Further, for instance, processor(s) 203 and/or memory 250 may optionally execute actions or operations defined by a bit modifying component 228 for modifying one or more bits of a channel feedback request to ensure legacy STAs do not process the request. In an aspect, for example, bit modifying component 228 may include hardware (e.g., one or more processor modules of the processor(s) 203) and/or computer-readable code or instructions stored in memory 250 and executable by at least one of the processor(s) 203 to perform the specially configured bit modifying operations described herein. Further, for instance, processor(s) 203 and/or memory 250 may optionally execute actions or operations defined by a CRC component 230 for modifying CRC of a request for channel feedback to avoid a new format of the request for channel feedback being processed by the one or more legacy STAs. In an aspect, for example, CRC component 230 may include hardware (e.g., one or more processor modules of the processor(s) 203) and/or computer-readable code or instructions stored in memory 250 and executable by at least one of the processor(s) 203 to perform the specially configured CRC modifying operations described herein.

Figure 3:
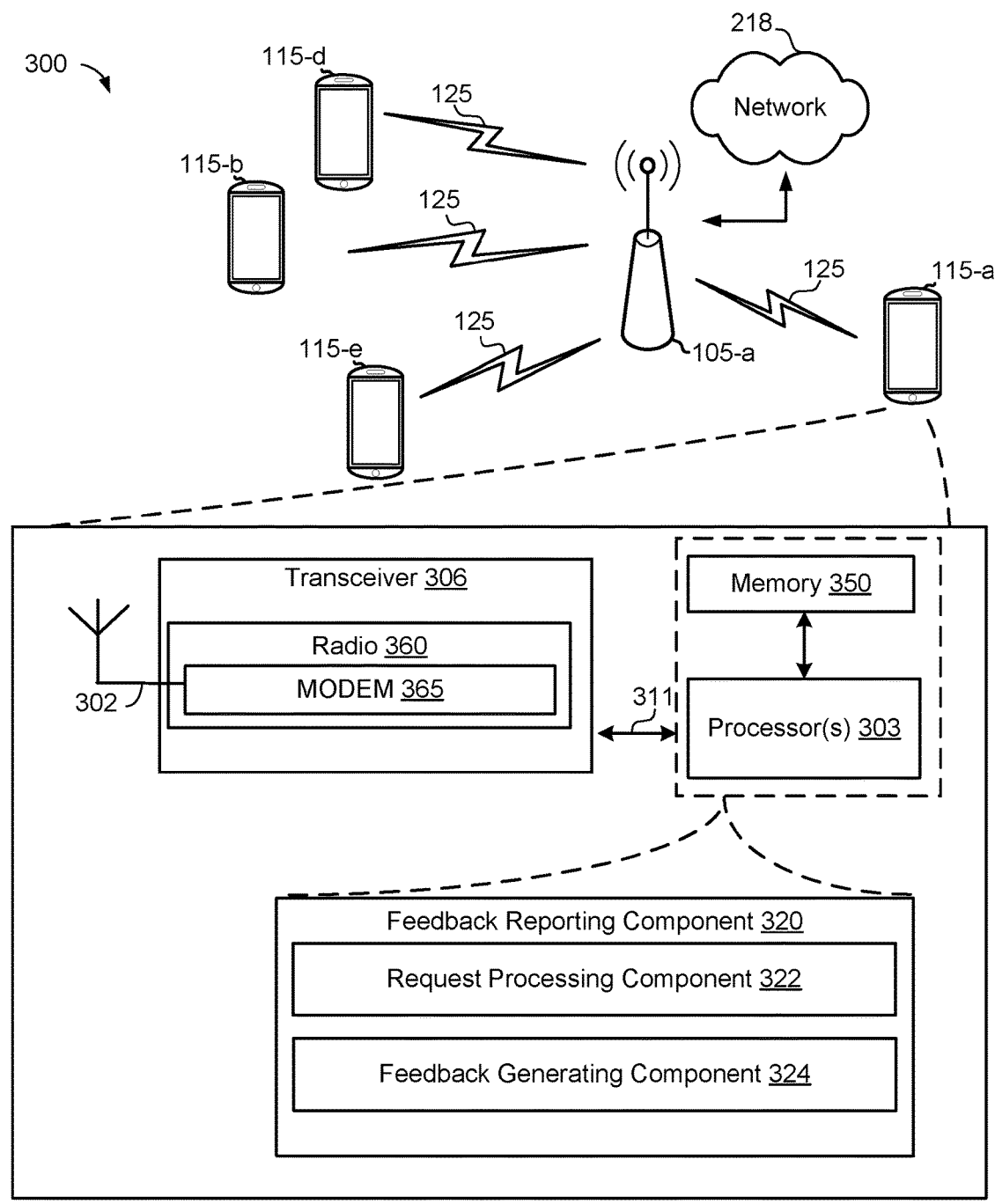
FIG. 3 is a schematic diagram of an example of a communication network including aspects of a wireless station for generating channel feedback in a WLAN in accordance with various aspects described herein.

Referring to FIG. 3, in an aspect, a wireless communication system 300 is similar to wireless communication system 200 including STAs 115-a, 115-b, 115-d, and 115-e in wireless communication with at least one AP, such as AP1 105-a connected to network 218, similar to STAs 115-a, 115-b, 115-d, and 115-e, and AP1 105-a of FIG. 1.

In an aspect, STA1 115-a may include a memory 350, one or more processors 303 and a transceiver 306. The memory 350, one or more processors 303 and the transceiver 306 may communicate internally via a bus 311. In some examples, the memory 350 and the one or more processors 303 may be part of the same hardware component (e.g., may be part of a same board, module, or integrated circuit). Alternatively, the memory 350 and the one or more processors 303 may be separate components that may act in conjunction with one another. In some aspects, the bus 311 may be a communication system that transfers data between multiple components and subcomponents of the STA1 115-a. In some examples, the one or more processors 303 may include any one or combination of modem processor, baseband processor, digital signal processor, and/or transmit processor. Additionally or alternatively, the one or more processors 303 may include a feedback reporting component 320 for carrying out one or more methods or procedures described herein. The feedback reporting component 320 may comprise hardware, firmware, and/or software and may be configured to execute code or perform instructions stored in a memory (e.g., a computer-readable storage medium).

In some examples, the STA1 115-a may include the memory 350, such as for storing data used herein and/or local versions of applications or feedback reporting component 320 and/or one or more of its subcomponents being executed by the one or more processors 303. Memory 350 can include any type of computer-readable medium usable by a computer or processor 303, such as random access memory (RAM), read only memory (ROM), tapes, magnetic discs, optical discs, volatile memory, non-volatile memory, and any combination thereof. In an aspect, for example, memory 350 may be a computer-readable storage medium (e.g., a non-transitory medium) that stores computer-executable code. The computer-executable code may define one or more operations or functions of feedback reporting component 320 and/or one or more of its subcomponents, and/or data associated therewith. The computer-executable code may define these one or more operations or functions when STA1 115-a is operating processor 303 to execute feedback reporting component 320 and/or one or more of its subcomponents. In some examples, the STA1 115-a may further include a transceiver 306 for reporting channel feedback to, and/or receiving a request for channel feedback from, an AP, such as AP1 105-a. The transceiver 306 may comprise hardware, firmware, and/or software and may be configured to execute code or perform instructions stored in a memory (e.g., a computer-readable storage medium). The transceiver 306 may include multiple radios and modems including radio 360 comprising a modem 365.

In particular, processor(s) 303 and/or memory 350 may execute actions or operations defined by feedback reporting component 320 or its subcomponents. For instance, processor(s) 303 and/or memory 350 may execute actions or operations defined by a request processing component 322 for processing a request for channel feedback received from an AP. In an aspect, for example, request processing component 322 may include hardware (e.g., one or more processor modules of the processor(s) 303) and/or computer-readable code or instructions stored in memory 350 and executable by at least one of the processor(s) 303 to perform the specially configured request processing operations described herein. Further, for instance, processor(s) 303 and/or memory 350 may execute actions or operations defined by a feedback generating component 324 for generating a channel feedback matrix for an AP based on the channel feedback request. In an aspect, for example, feedback generating component 324 may include hardware (e.g., one or more processor modules of the processor(s) 303) and/or computer-readable code or instructions stored in memory 350 and executable by at least one of the processor(s) 303 to perform the specially configured feedback generating operations described herein.

Figure 4:
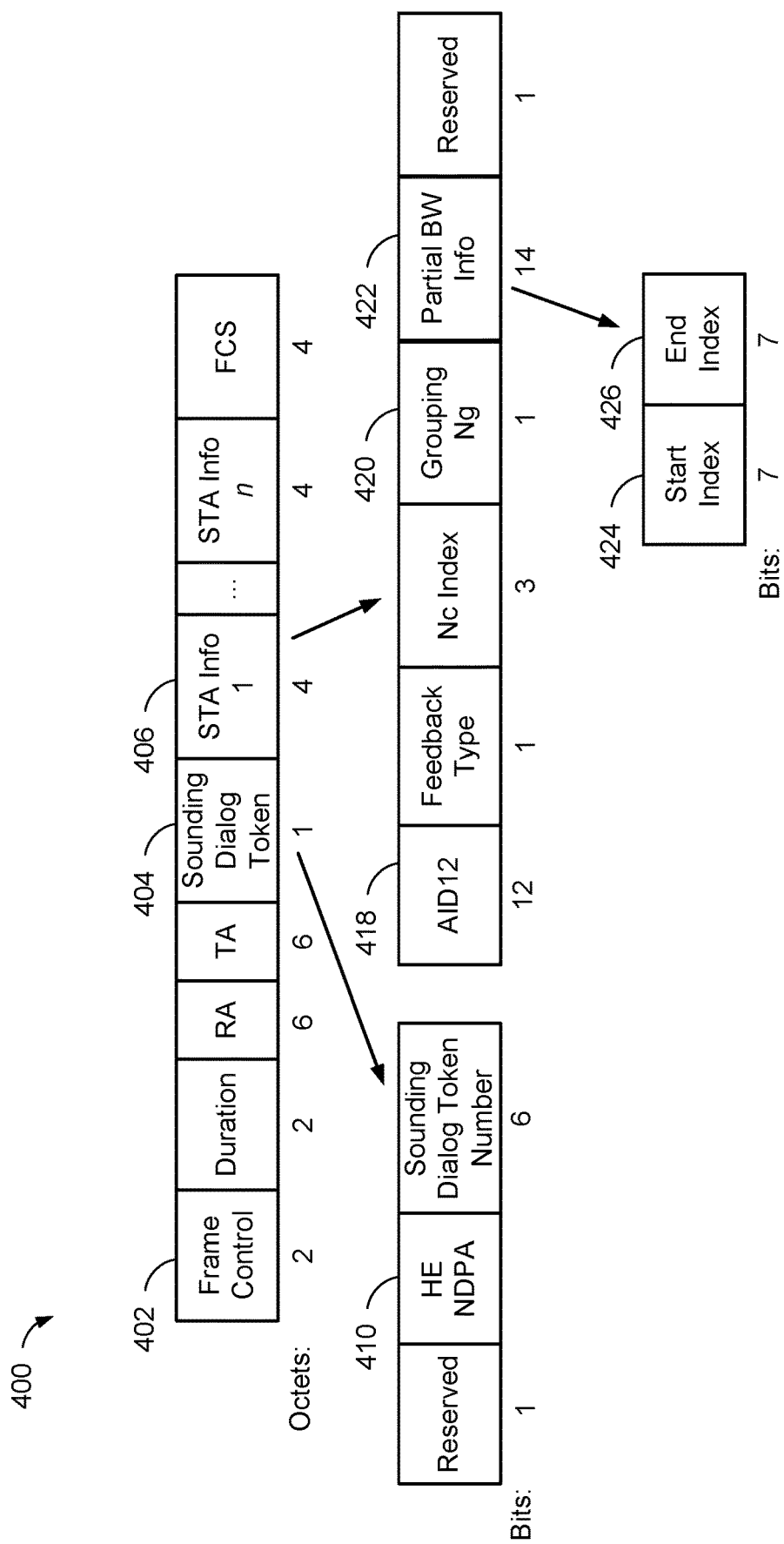
FIG. 4 is a diagram illustrating an example format for a channel feedback request.

FIG. 4 depicts an example format 400 of a request for channel feedback. For example, format 400 may correspond to a NDPA for an AP1 105-1 to transmit in a WLAN network announcing a subsequent NDP for generating and reporting channel feedback. Format 400 includes, among other fields, a frame control field 402, a sounding dialog token 404, and one or more STA information fields 406. The sounding dialog token 404 may include an indicator 410 specifying whether the NDPA is of a HE format (e.g., the new format different from a legacy VHT format), which may be a one bit or other sized indicator. The one or more STA information fields 406 may include, among other fields, an AID 418 of the STA, and one or more parameters indicating a portion of a channel bandwidth for which feedback is requested. As described, the one or more parameters may relate to a tone grouping factor Ng 420, an indication of a partial bandwidth 422, etc. The indication of the partial bandwidth 422, for example, may include a starting resource unit index 424 indicating a starting resource unit of the partial bandwidth for reporting channel feedback, and an ending resource unit index 426 indicating an ending resource unit of the partial bandwidth for reporting channel feedback. In this regard, as described further herein, AP1 105-a can limit the requested channel feedback to a partial bandwidth and/or to a portion of subcarriers defined by the tone grouping factor to lessen the channel feedback matrix size/complexity, and thus lessen bandwidth required to report the channel feedback matrix, processing time to process the channel feedback matrix, etc. The order and/or presence of the fields in the sounding dialog token 404 and/or STA info 406 shown in FIG. 4 are non-limiting examples, and various orders or presence of the fields and/or other fields may be used.

In this format 400, for example, each NDPA STA information field 406 can include an AID, which can be 12 bits such as to include a disambiguation bit as the MSB to ensure legacy STAs do not process the NDPA frame (e.g., of format 400) when encountering the set disambiguation bit (e.g., as the legacy STAs expect the MSB of the AID 418 to be 0).

NDPA STA information field 406 can also include a feedback type bit, which can indicate whether to use a single user or multiuser feedback type per-STA, a number of columns Nc per STA, which can be 3 bits to indicate a value 1-8 and can be included where the NDPA corresponds to more than one STA. The STA information fields 406 of the new format (e.g., format 400) can also include the additional parameters of the tone grouping factor Ng 420, which can be one or more bits to indicate grouping (e.g., 1 bit to indicating grouping of 4 or 16) and may be included where the NDPA corresponds to more than one STA, and an indicator 410 of partial bandwidth per STA, which can be 14 bits, for example, including a 7 bit starting resource unit index 424 and a 7 bit ending resource unit index 426. As described, the additional fields change the size of the NDPA, and thus a mechanism for indicating the format of the NDPA (e.g., whether of the new format including the additional parameters or of the legacy VHT format without the additional parameters) can be provided, such as one or more bits in the sounding dialog token 404, as described. In addition, mechanisms for avoiding processing of the NDPA by legacy STAs can be provided as well, such as a disambiguation bit in the AID 418, as described. In this regard, an AP communicating the request can control the Ng, quantization, and Nc of the sounding channel feedback reported by a corresponding STA, though the STA may also control the values in one example (e.g., where the NDPA is addressed to a single STA requesting SU type feedback).

FIG. 5 illustrates an example of a method 500 for communicating (e.g., by an AP) a request for channel feedback. Method 500 may include, at Block 502, generating a request for channel feedback, where the request indicates a first format different from a second format. In an aspect, request generating component 222 (FIG. 2), e.g., in conjunction with processor(s) 203 and/or memory 250, may generate the request for channel feedback. For example, request generating component 222 may generate the request to include an indicator that the request is of a first format (e.g., a new format, such as format 400, which may correspond to a IEEE 802.11ax format) different from the second format (e.g., a legacy VHT format, which may correspond to a IEEE 802.11ac format). For example, the indicator may include using a different value for the frame control field 402 (FIG. 4) than is used in the legacy VHT format, a bit in the sounding dialog token 404 (e.g., a previously reserved bit of the format, bit 1, HE NDPA indicator 410 in format 400 (FIG. 4), etc.), a MSB or other bit of a STA information field 406, AID 418, or other portion of the request, etc. This can allow HE STAs to differentiate the new format request from legacy VHT formatted requests for channel feedback and/or can cause legacy VHT STAs to ignore the request. As described, the request can correspond to a NDPA. Moreover, the new format of the request can correspond to format 400 of FIG. 4, including at least a portion of the fields in format 400.

In addition, in this regard, generating the request at Block 502 may optionally include, at Block 504, indicating, in the request, a partial bandwidth over which channel feedback is requested. In an aspect, request generating component 222, e.g., in conjunction with processor(s) 203 and/or memory 250, can indicate, in the request, the partial bandwidth over which channel feedback is requested. For example, request generating component 222 can generate the request to be of a format similar to format 400 (FIG. 4) with an indication of partial bandwidth 422. In an aspect, request generating component 222 can indicate a starting resource unit index 424 and/or ending resource unit index 426 of the channel bandwidth in the request for the STA to measure a corresponding NDP (e.g., measure power, phase shift, etc. of the bandwidth from the starting resource unit index 424 to the ending resource unit index 426 within the channel bandwidth).

In another example, generating the request at Block 502 may optionally include, at Block 506, specifying, in the request, a tone grouping factor indicating a tone grouping for a matrix representing the channel feedback. In an aspect, request generating component 222, e.g., in conjunction with processor(s) 203 and/or memory 250, can specify, in the request, a tone grouping factor indicating a tone grouping for a matrix representing the channel feedback. For example, request generating component 222 can generate the request to be of a format similar to format 400 (FIG. 4) with an indication of tone grouping factor Ng 420 for the STA to report channel feedback, such that the STA can report channel feedback for a subset of subcarriers represented by the tone grouping factor (e.g., every nth subcarrier in the channel for tone grouping factor n).

In another example, generating the request at Block 502 may optionally include, at Block 508, generating one or more bits in the request that do not match an AID of one or more legacy STAs. In an aspect, bit modifying component 228, e.g., in conjunction with processor(s) 203 and/or memory 250, can generate one or more bits in the request that do not match an AID of one or more legacy STAs—the one or more bits are referred to herein as disambiguation bit(s). For example, for any bit/byte of the request that may be parsed by a legacy STA as an AID, bit modifying component 228 can ensure the bit/byte does not match legacy STA AIDs. In one example, AID assigning component 226 can additionally assign AIDs to one or more legacy STAs, where the AIDs have bits/bytes that do not match (e.g., are inconsistent with) one or more bytes of the new format for the request (e.g., format 400 of NDPA). For example, for any byte that may be interpreted as a first byte of a STA information field 406 by a legacy STA, bit modifying component 228 can set a MSB of the field to 1, where legacy STAs may expect this field to be 0. Thus, the legacy STA may not process the request. In an example, request generating component 222 can generate the request to include an additional bit in the AID (e.g., a 12 bit AID), and AID assigning component 226 can assign AIDs to legacy STAs that do not begin with or otherwise include the additional bit set at a certain value.

In another example, for any byte that may be interpreted as a first byte of a STA information field by a legacy STA, bit modifying component 228 can set the byte, and/or a corresponding bit, such that it does not match an AID of one or more STAs. As described, AID assigning component 226 may limit assigning AIDs to the legacy STAs such that values of AIDs assigned to the legacy STAs will not match bytes used in the new format of the request. Specifically, in an example, AID assigning component 226 can limit AID assignment for legacy STAs up to 1023 (e.g., $2^{10}-1$ using the least significant 10 bits), then set the MSB of the bit interpreted by legacy STAs as the second AID to 1. In this regard, legacy STAs receiving the request do not detect their AIDs when processing the extra bits of the request corresponding to the additional parameters of the new format, and thus do not process the request.

For instance, bit modifying component 228 can include and set one or more disambiguation bits in the request (e.g., in the STA information field 406), and AID assigning component 226 can assign AIDs that do not include (or are inconsistent with) the set value of the disambiguation bit(s)

included in the request for channel feedback to one or more legacy STAs. In one example, the request can include the one or more disambiguation bits in a STA information field 406 (e.g. as one or more bits before the tone grouping factor Ng 420, such as an MSB of the AID 418) or substantially anywhere in the STA information field 406. For example, using a higher number of disambiguation bits may allow for reducing a group of AIDs assignable to the legacy STAs.

In another example, generating the request at Block 502 may optionally include, at Block 510, modifying one or more bytes in a CRC applied to the request. In an aspect, CRC component 230, e.g., in conjunction with processor(s) 203 and/or memory 250, can modify the one or more bytes in the CRC applied to the request. For example, HE STAs can know the modification of the CRC performed by the AP1 105-*a*, and can perform a reverse modification to obtain the correct CRC value in performing CRC of the request received from AP1 105-*a*, whereas CRC performed by legacy STAs may fail. In this regard, the legacy STAs may not process the request of the new format.

In another example, generating the request at Block 502 may optionally include, at Block 512, using multiple legacy requests to indicate additional parameters. In an aspect, request generating component 222, e.g., in conjunction with processor(s) 203 and/or memory 250, can use multiple legacy requests to indicate additional parameters. For example, request generating component 222 can use multiple STA information fields 406 of the legacy format (e.g., without tone grouping factor Ng 420 or indication of partial bandwidth 422) to indicate additional parameters, such as tone grouping factor, indication of partial bandwidth, etc.). For example, request generating component 222 can specify the same AID in the multiple STA information fields, and HE STAs can be configured to possibly process multiple STA information fields and know which legacy fields and/or bits correspond to additional parameters in additional STA fields for the AID.

Method 500 may also include, at Block 514, transmitting the request for channel feedback to a HE STA. In an aspect, channel feedback component 220, e.g., in conjunction with processor(s) 203, memory 250, and/or transceiver 206, can transmit the request for channel feedback to the HE STA. As described, for example, the request can include a NDPA transmitted to the HE STA, and request generating component 222 can generate the request to prevent processing of the request by legacy STAs, as described. In addition, for example, channel feedback component 220 can subsequently transmit, as part of the request, a NDP that the HE STA can receive and measure based on parameters specified in the NDPA, as described further herein. In another example, however, request generating component 222 may not modify the channel feedback request before transmission thereof or may not otherwise attempt to prevent legacy STAs from processing the request (e.g., the NDPA). In this example, the subsequent NDP transmitted by the AP1 105-*a* may use a different preamble than a legacy NDP, and thus a legacy STA may not process the subsequent NDP (and thus may not provide feedback even where the legacy STA has detected its AID in a new format NDPA).

In any case, method 500 may also include, at Block 516, receiving channel feedback from the HE STA. In an aspect, channel feedback component 220, e.g., in conjunction with processor(s) 203, memory 250, and/or transceiver 206, can receive channel feedback from the HE STA. For example, channel feedback component 220 may receive the channel feedback as a compressed channel feedback matrix, which may be compressed based on a tone grouping factor Ng 420 specified in the request, may indicate feedback for a partial bandwidth based on an indication of partial bandwidth 422 specified in the request, etc. The HE STA can transmit the channel feedback matrix based on measuring channel feedback corresponding to the NDP, as described further herein.

In an example, method 500 may also optionally include, at Block 518, beamforming transmissions to the HE STA based on the channel feedback. In an aspect, transceiver 206, e.g., in conjunction with processor(s) 203 and/or memory 250, can beamform transmissions to the HE STA based on the channel feedback. For example, channel feedback component 220 can process the channel feedback matrix to generate a steering matrix to beamform transmissions to the HE STA to account for the channel feedback. In this example, transceiver 206 can accordingly apply the steering matrix in transmitting subsequent communications to the HE STA.

FIG. 6 illustrates an example of a method 600 for communicating (e.g., by a STA) channel feedback based on a request for the channel feedback. Method 600 may include, at Block 602, receiving a request for channel feedback, where the request indicates a first format different from a second format. In an aspect, feedback reporting component 320 (FIG. 3), e.g., in conjunction with processor(s) 303, memory 350, and/or transceiver 306, may receive the request for channel feedback, where the request indicates a first format (e.g., a new format, such as format 400, which may correspond to a IEEE 802.11ax format) different from a second format (e.g., a legacy VHT format, which may correspond to a IEEE 802.11ac format). For example, feedback reporting component 320 can receive the request from an AP, such as AP1 105-*a*, and the request may indicate a format (e.g., whether of a new format or a legacy format). As described, in an example, the request may be a NDPA and may indicate a format by using a frame control field 402 value, a bit indicator (e.g., indicator 410) in a sounding dialog token 404, a MSB of the STA information field 406 (e.g., a MSB of AID 418), etc. In another example, feedback reporting component 320 can modify one or more bytes of a CRC of the request, as described where the AP1 105-*a* modifies the one or more bytes to prevent legacy STAs from processing the request, and may perform a CRC to ensure the request is properly received. In any case, in an example, request processing component 322 can determine whether the request is of the new format or a legacy (e.g., VHT) format for further processing the request to determine one or more related parameters.

Method 600 may also include, at Block 604, determining, from the request where the request is of the first format, one or more parameters related to reporting channel feedback for a portion of channel bandwidth. In an aspect, request processing component 322, e.g., in conjunction with processor(s) 303 and/or memory 350, may determine, from the request where the request is of the first format (e.g., the new format), the one or more parameters related to reporting channel feedback for the portion of the channel bandwidth. As described, where request processing component 322 determines the request is of the new format (e.g., format 400 of NDPA), request processing component 322 can determine the additional parameters in one or more fields of the new format.

For example, determining the one or more parameters at Block 604 may optionally include, at Block 606, determining a partial bandwidth for reporting channel feedback. In an aspect, request processing component 322, e.g., in conjunction with processor(s) 303 and/or memory 350, may determine the partial bandwidth for reporting channel feedback.

For example, request processing component 322 may analyze the request based on format 400, and may determine the indication of a partial bandwidth 422 as a field in the format 400. For example, request processing component 322 may determine a starting resource unit index 424 and/or ending resource unit index 426 specified in the indicator 410. In another example, request processing component 322 may determine the partial bandwidth in a different STA information field 406 for the STA1 115-*a* (e.g., having the same AID).

For example, determining the one or more parameters at Block 604 may optionally include, at Block 608, determining a tone grouping factor for reporting channel feedback. In an aspect, request processing component 322, e.g., in conjunction with processor(s) 303 and/or memory 350, may determine the tone grouping factor for reporting channel feedback. For example, request processing component 322 may analyze the request based on format 400, and may determine the tone grouping factor Ng 420 as a field in the format 400. In another example, request processing component 322 may determine the tone grouping factor in a different STA information field 406 for the STA1 115-*a* (e.g., having the same AID).

Method 600 may also include, at Block 610, generating the channel feedback based on the one or more parameters. In an aspect, feedback generating component 324, e.g., in conjunction with processor(s) 303 and/or memory 350, can generate the channel feedback based on the one or more parameters. For example, feedback generating component 324 may generate a channel feedback matrix indicating channel feedback for a communication subsequently received from AP1 105-*a*, which may include a NDP sent by AP1 105-*a* as part of the request for channel feedback (e.g., a NDP corresponding to the NDPA). In an example, feedback generating component 324 can generate the channel feedback matrix by measuring power, phase shift, etc. of the communication received from AP1 105-*a* over a plurality of subcarriers and spatial streams. For example, feedback generating component 324 can measure the power, phase shift, etc. over a partial bandwidth of the channel bandwidth specified in indicator 410 (e.g., starting from the starting resource unit index 424 and through ending resource unit index 426) of the communication. In addition, feedback generating component 324 can report measurements of the power, phase shift, etc. over the partial bandwidth for certain subcarriers based on the tone grouping factor (e.g., every nth subcarrier in the partial bandwidth), which may comprise rows of the matrix. This facilitates compression of the channel feedback matrix such to decrease resources used in transmitting the feedback matrix. Moreover, feedback generating component 324 may generate the channel feedback matrix having columns related to multiple spatial streams indicated by a number of columns Nc in the NDPA.

Method 600 may also include, at Block 612, transmitting the channel feedback in response to the request. In an aspect, feedback reporting component 320, e.g., in conjunction with processor(s) 303, memory 350, and/or transceiver 306, can transmit the channel feedback in response to the request. For example, feedback reporting component 320 can transmit the feedback to the AP1 105-*a* requesting the feedback, and AP1 105-*a* may process the channel feedback matrix to generate a steering matrix for beamforming communications to the STA1 115-*a*, as described.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of described aspects.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect can include a computer readable medium embodying a method for requesting and/or reporting channel feedback in unlicensed spectrum. Accordingly, the aspects described herein are not limited to the illustrated examples.

While the foregoing description shows illustrative aspects, it should be noted that various changes and modifications could be made herein without departing from the scope of the aspects as defined by the appended claims. The functions, steps and/or actions of the method claims in accordance with the aspects described herein need not be performed in any particular order. Furthermore, although certain aspects may be described or claimed in the singular, the plural is contemplated unless limitation to the singular is explicitly stated.

What is claimed is:

1. An apparatus for requesting channel feedback, comprising:
a memory storing channel feedback instructions; and
at least one processor coupled with the memory, wherein the at least one processor is configured to execute the channel feedback instructions to:
generate a request for channel feedback, wherein the request includes an indicator specifying that the request uses a first format different from a second format, wherein the indicator corresponds to a most significant bit (MSB) of a station (STA) information field that is part of an association identifier field for a legacy STA defined by the second format, and wherein the indicator is set to a value that results in the association identifier not matching association identifiers assigned to STAs that communicate using the second format;
transmit the request for channel feedback to a STA; and
receive channel feedback from the STA.

2. The apparatus of claim 1, wherein the at least one processor is further configured to execute the channel feedback instructions to assign at least one of the association identifiers to at least one very high throughput (VHT) STA that communicates using the second format to avoid the VHT STA determining the request is intended for the VHT STA based on the indicator.

3. The apparatus of claim 1, wherein the at least one processor is further configured to execute the channel feedback instructions to generate the request for channel feedback to include a sounding dialog token in the request indicating the request is of the first format.

4. The apparatus of claim 3, wherein the first format is associated with Institute of Electrical and Electronics Engineers (IEEE) 802.11ax, and the second format is associated with IEEE 802.11ac.

5. The apparatus of claim 1, wherein the at least one processor is configured to execute the channel feedback instructions to generate the request for channel feedback to indicate a partial bandwidth over which the channel feedback is requested.

6. The apparatus of claim 5, wherein the request indicates the partial bandwidth as a starting resource unit and an ending resource unit.

7. The apparatus of claim 1, wherein the at least one processor is configured to execute the channel feedback instructions to generate the request for channel feedback to specify a tone grouping factor indicating a tone grouping for a matrix representing the channel feedback.

8. The apparatus of claim 1, wherein the at least one processor is further configured to execute the channel feedback instructions to limit association identifiers assigned to one or more very high throughput (VHT) STAs that communicate using the second format to avoid the VHT STA receiving the request based on the indicator.

9. A method for requesting channel feedback, comprising:
generating, by an access point, a request for channel feedback, wherein the request includes an indicator specifying that the request uses a first format different from a second format, wherein the indicator corresponds to a most significant bit (MSB) of a station (STA) information field that is part of an association identifier field for a legacy STA defined by the second format, and wherein the indicator is set to a value that results in the association identifier not matching association identifiers assigned to STAs that communicate using the second format;
transmitting, by the access point, the request for channel feedback to a STA; and
receiving, by the access point and from the STA, channel feedback based on the request.

10. The method of claim 9, further comprising assigning at least one of the association identifiers to at least one very high throughput (VHT) STA that communicates using the second format to avoid the VHT STA determining the request is intended for the VHT STA based on the indicator.

11. The method of claim 9, further comprising generating the request for channel feedback to include a sounding dialog token in the request indicating the request is of the first format.

12. The method of claim 11, wherein the first format is associated with Institute of Electrical and Electronics Engineers (IEEE) 802.11ax, and the second format is associated with IEEE 802.11ac.

13. The method of claim 9, wherein the request for channel feedback includes a partial bandwidth over which the channel feedback is requested.

14. The method of claim 13, wherein the request indicates the partial bandwidth as a starting resource unit and an ending resource unit.

15. The method of claim 9, wherein the request for channel feedback specifies a tone grouping factor indicating a tone grouping for a matrix representing the channel feedback.

16. The method of claim 9, further comprising limiting association identifiers assigned to one or more very high throughput (VHT) STAs that communicate using the second format to avoid the VHT STA receiving the request based on the indicator.

17. An apparatus for reporting channel feedback, comprising:
a memory storing channel feedback instructions; and
at least one processor coupled with the memory, wherein the at least one processor is configured to execute the channel feedback instructions to:
receive a request to report channel feedback, wherein the request includes an indicator specifying that the request uses a first format different from a second format, wherein the indicator corresponds to a most significant bit (MSB) of a station (STA) information field that is part of an association identifier field for a legacy STA defined by the second format, and wherein the indicator is set to a value that results in the association identifier not matching association identifiers assigned to STAs that communicate using the second format;
determine, from the request, one or more parameters related to reporting the channel feedback for a portion of a channel bandwidth;

generate the channel feedback based on the one or more parameters; and transmit the channel feedback in response to the request.

18. The apparatus of claim 17, wherein the at least one processor is further configured to execute the channel feedback instructions to determine the request is of the first format based at least in part on a bit in a sounding dialog token in the request.

19. The apparatus of claim 18, wherein the first format is associated with Institute of Electrical and Electronics Engineers (IEEE) 802.11ax, and the second format is associated with IEEE 802.11ac.

20. The apparatus of claim 17, wherein the one or more parameters indicate a partial bandwidth for reporting the channel feedback, wherein the at least one processor is configured to execute the channel feedback instructions to generate the channel feedback based at least in part on determining the channel feedback for the partial bandwidth.

21. The apparatus of claim 20, wherein the request indicates a starting resource unit and an ending resource unit of the partial bandwidth.

22. The apparatus of claim 17, wherein the request indicates a tone grouping factor for reporting the channel feedback, and wherein the at least one processor is configured to execute the channel feedback instructions to generate the channel feedback for a portion of subcarriers in the channel bandwidth based on the tone grouping factor.

23. A method for reporting channel feedback, comprising:
receiving, by a station (STA) from an access point, a request to report channel feedback, wherein the request includes an indicator specifying that the request uses a first format different from a second format, wherein the indicator corresponds to a most significant bit MSB) of a STA information field that is part of an association identifier field for a legacy STA defined by the second format, and wherein the indicator is set to a value that results in the association identifier not matching association identifiers assigned to STAs that communicate using the second format;

determining, by the STA and from the request, one or more parameters related to reporting the channel feedback for a portion of a channel bandwidth;

generating, by the STA, the channel feedback based on the one or more parameters; and transmitting, by the STA to the access point, the channel feedback in response to the request.

24. The method of claim 23, further comprising determining the request is of the first format based at least in part on a bit in a sounding dialog token in the request.

25. The method of claim 24, wherein the first format is associated with Institute of Electrical and Electronics Engineers (IEEE) 802.11ax, and the second format is associated with IEEE 802.11ac.

26. The method of claim 23, wherein the one or more parameters indicate a partial bandwidth for reporting the channel feedback, wherein generating the channel feedback is based at least in part on determining the channel feedback for the partial bandwidth.

* * * * *